United States Patent
Jaranson et al.

(10) Patent No.: US 11,130,432 B2
(45) Date of Patent: Sep. 28, 2021

(54) VEHICLE SEATING ASSEMBLY WITH THIGH TILT

(71) Applicant: Ford Global Technologies, LLC, Dearborn, MI (US)

(72) Inventors: John Wayne Jaranson, Dearborn, MI (US); Johnathan Andrew Line, Northville, MI (US); Marcos Silva Kondrad, Macomb Township, MI (US); Patrick Maloney, Livonia, MI (US); Christian J. Hosbach, Pittsburgh, PA (US); Sangram Tamhankar, Canton, MI (US); Vishal Vinayak Nageshkar, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 75 days.

(21) Appl. No.: 16/709,283

(22) Filed: Dec. 10, 2019

(65) Prior Publication Data
US 2021/0170930 A1    Jun. 10, 2021

(51) Int. Cl.
| | |
|---|---|
| *B60N 2/62* | (2006.01) |
| *B60N 2/90* | (2018.01) |
| *B60N 2/02* | (2006.01) |
| *A47C 7/02* | (2006.01) |
| *B60N 2/70* | (2006.01) |
| *A61G 5/10* | (2006.01) |
| *B60N 2/64* | (2006.01) |

(52) U.S. Cl.
CPC .......... *B60N 2/914* (2018.02); *B60N 2/0284* (2013.01); *A47C 7/024* (2013.01); *A47C 7/029* (2018.08); *A61G 5/1081* (2016.11); *B60N 2/62* (2013.01); *B60N 2/646* (2013.01); *B60N 2/7082* (2013.01); *B60N 2/995* (2018.02)

(58) Field of Classification Search
CPC ........ B60N 2/914; B60N 2/0284; B60N 2/62; B60N 2/7082; B60N 2/0232; B60N 2/995; B60N 2/646; A47C 7/029; A47C 7/024; A61G 5/1081
See application file for complete search history.

(56) References Cited

U.S. PATENT DOCUMENTS

| | | |
|---|---|---|
| 3,348,880 A | 10/1967 | Swann |
| 4,334,709 A | 6/1982 | Akiyama et al. |
| 4,589,695 A | 5/1986 | Isono |
| 4,629,248 A | 12/1986 | Mawbey |

(Continued)

*Primary Examiner* — Syed A Islam
(74) *Attorney, Agent, or Firm* — David Coppiellie; Price Heneveld LLP (57) ABSTRACT

A seat of a vehicle seating assembly includes a seat carrier, a thigh tilt housing, a thigh extension housing, and an inflatable member. The thigh tilt housing is coupled to a forward region of the seat carrier. A recess is defined by the thigh tilt housing, with the recess being positioned in an upper surface of the thigh tilt housing. A motor is received within the recess. The thigh extension housing is coupled to the motor, with the thigh extension housing being movable in a fore-aft direction relative to the thigh tilt housing. A fastener couples the thigh tilt housing to the seat carrier in a manner that permits pivotable motion of the thigh tilt housing along a vertical plane. The inflatable member is positioned between the seat carrier and the thigh tilt housing.

20 Claims, 3 Drawing Sheets

(56) References Cited

U.S. PATENT DOCUMENTS

| | | | | |
|---|---|---|---|---|
| 5,366,272 A | * | 11/1994 | Lebrun | B60N 2/62 |
| | | | | 297/284.11 |
| 5,607,204 A | * | 3/1997 | Gryp | B60N 2/0715 |
| | | | | 297/284.11 |
| 5,967,608 A | | 10/1999 | Van Sickle | |
| 6,036,266 A | | 3/2000 | Massara | |
| 6,106,063 A | * | 8/2000 | Dauphin | A47C 1/023 |
| | | | | 297/284.1 |
| 6,402,245 B1 | | 6/2002 | Newton et al. | |
| 9,090,185 B2 | | 7/2015 | McMillen et al. | |
| 9,187,019 B2 | * | 11/2015 | Dry | B60N 2/62 |
| 9,278,636 B2 | * | 3/2016 | Duncan | B60N 2/62 |
| 9,399,418 B2 | * | 7/2016 | Line | B60N 2/995 |
| 9,527,408 B2 | * | 12/2016 | Stancato | B60N 2/4279 |
| 9,573,502 B2 | * | 2/2017 | Seki | B60N 2/646 |
| 9,688,170 B2 | | 6/2017 | Wroblewski et al. | |
| 9,902,293 B2 | * | 2/2018 | Line | B60N 2/0284 |
| 9,963,058 B2 | * | 5/2018 | Line | B60N 2/707 |
| 9,981,577 B2 | | 5/2018 | Zouzal et al. | |
| 9,981,582 B2 | * | 5/2018 | Line | B29C 49/20 |
| 10,081,279 B2 | * | 9/2018 | Line | B60N 2/62 |
| 10,266,073 B2 | * | 4/2019 | Line | B60N 2/0284 |
| 10,286,818 B2 | | 5/2019 | Line et al. | |
| 10,286,824 B2 | * | 5/2019 | Boland | B60N 2/976 |
| 10,625,646 B2 | * | 4/2020 | Kondrad | B60N 2/62 |
| 2014/0292051 A1 | * | 10/2014 | Planson | B60N 2/0284 |
| | | | | 297/337 |
| 2015/0165935 A1 | * | 6/2015 | Sachs | B60N 2/22 |
| | | | | 297/342 |
| 2015/0258914 A1 | * | 9/2015 | Lee | B60N 2/62 |
| | | | | 297/284.11 |
| 2017/0240074 A1 | * | 8/2017 | McCoy | B60N 2/914 |
| 2017/0291521 A1 | * | 10/2017 | Line | B60N 2/02 |

* cited by examiner

FIG. 3

VEHICLE SEATING ASSEMBLY WITH THIGH TILT

FIELD OF THE DISCLOSURE

The present disclosure generally relates to a vehicle seating assembly. More specifically, the present disclosure relates to a seat of a vehicle seating assembly with thigh tilt capability.

BACKGROUND OF THE INVENTION

Vehicles are typically provided with one or more vehicle seating assemblies. Consumers are increasingly looking for additional features and additional comfort options when occupying vehicles. Accordingly, additional solutions are needed that provide additional features and/or additional comfort options for vehicle seating assemblies.

SUMMARY OF THE INVENTION

According to a first aspect of the present disclosure, a seat of a vehicle seating assembly includes a seat carrier, first and second thigh tilt housings, first and second thigh extension housings, and first and second inflatable members. The first thigh tilt housing is coupled to a forward region of the seat carrier. A first recess is defined by the first thigh tilt housing, with the first recess being positioned in an upper surface of the first thigh tilt housing. A first motor is received within the first recess. The first thigh extension housing is coupled to the first motor, with the first thigh extension housing being movable in a fore-aft direction relative to the first thigh tilt housing. A first fastener couples the first thigh tilt housing to the seat carrier in a manner that permits pivotable motion of the first thigh tilt housing along a first vertical plane. A first inflatable member is positioned between the seat carrier and the first thigh tilt housing. The second thigh tilt housing is coupled to the forward region of the seat carrier. The first and second thigh tilt housings are arranged along a horizontal plane of the seat such that the first and second thigh tilt housings are adjacent to one another. A second recess is defined by the second thigh tilt housing, with the second recess being positioned in an upper surface of the second thigh tilt housing. A second motor is received within the second recess. The second thigh extension housing is coupled to the second motor, with the second thigh extension housing being movable in the fore-aft direction relative to the second thigh tilt housing. A second fastener couples the second thigh tilt housing to the seat carrier in a manner that permits pivotable motion of the second thigh tilt housing along a second vertical plane. The second inflatable member is positioned between the seat carrier and the second thigh tilt housing.

Embodiments of the first aspect of the present disclosure can include any one or a combination of the following features:
- the first and second members are operable between a deflated state and a fully-inflated state, wherein adjustment of a degree of inflation of the first and second inflatable members actuates the first and second thigh tilt housings between raised and lowered positions, respectively;
- the inflated state of the first and second inflatable members provides a degree of compliance of the first and second thigh tilt housings in response to external forces, respectively;
- the first and second motors each include a lead screw and the drive nut, wherein the first and second thigh extension housings are coupled to the drive nut on the first and second motors, respectively, such that rotational motion of the lead screws is translated into linear motion of the first and second thigh extension housings;
- biasing members that are coupled to the seat carrier and each of the first and second thigh tilt housings such that the first and second thigh tilt housing are biased toward a lowered position;
- adjustment of the first and second thigh tilt housings in a vertical direction is independent of adjustment of the first and second thigh extension housings in the fore-aft direction;
- the first and second vertical planes are non-parallel to one another;
- the first and second motors move with the first and second thigh tilt housings along the first and second vertical planes, respectively;
- the first and second motors actuate the first and second thigh extension housings in the fore-aft direction, respectively, independent of an angular orientation of the first and second thigh extension housings relative to the seat carrier; and
- the first thigh tilt housing and the first thigh extension housing provide an enclosure for the first motor, and the second thigh tilt housing and the second thigh extension housing provide an enclosure for the second motor.

According to a second aspect of the present disclosure, a seat of a vehicle seating assembly includes a seat carrier, a first thigh tilt housing, a first motor, a first thigh extension housing, a first inflatable member, a second thigh tilt housing, a second motor, a second thigh extension housing, and a second inflatable member. The first thigh tilt housing is coupled to a forward region of the seat carrier. A first recess is defined by the first thigh tilt housing, with the first recess being positioned in an upper surface of the first thigh tilt housing. The first motor is received within the first recess. The first thigh extension housing is coupled to the first motor, with the first thigh extension housing being movable in a fore-aft direction between extended and retracted positions relative to the first thigh tilt housing. A first fastener couples the first thigh tilt housing to the seat carrier in a manner that permits pivotable motion of the first thigh tilt housing along a first vertical plane. The first inflatable member is positioned between the seat carrier and the first thigh tilt housing, with the first inflatable member being operable between a deflated state and a fully-inflated state. Adjusting a degree of inflation of the first inflatable member adjusts the first thigh tilt housing between raised and lowered positions along the first vertical plane. The first thigh tilt housing, the first motor, and the first thigh extension housing each move along the first vertical plane as the degree of inflation of the first inflatable member is adjusted. The second thigh tilt housing is coupled to the forward region of the seat carrier, with the first and second thigh tilt housings being arranged along a horizontal plane such that the first and second thigh tilt housings are adjacent to one another. The second recess is defined by the second thigh tilt housing, with the second recess being positioned in an upper surface of the second thigh tilt housing. The second motor is received within the second recess. The second thigh extension housing is coupled to the second motor, with the second thigh extension housing being movable in the fore-aft direction between extended and retracted positions relative to the second thigh tilt housing. A second fastener couples the second thigh tilt housing to the seat carrier in a manner that permits pivotable motion of the second thigh tilt housing along a second vertical plane. The second inflatable member is positioned between the seat carrier and the second thigh tilt housing, with the second inflatable member being operable between a deflated state and the fully-inflated state. Adjusting a degree of inflation of the second inflatable member adjusts the second thigh tilt housing between raised and lowered positions along the second vertical plane. The second thigh tilt housing, the second motor, and the second thigh extension housing each move along the second vertical plane as the degree of inflation of the second inflatable member is adjusted.

- the inflated state of the first and second inflatable members provides a degree of compliance to the first and second thigh tilt housings in response to external forces, respectively;
- the first and second motors each include a lead screw and the drive nut, wherein the first and second thigh extension housings are coupled to the drive nut on the first and second motors, respectively, such that rotational motion of the lead screws is translated into linear motion of the first and second thigh extension housings;
- biasing members that are coupled to the seat carrier and each of the first and second thigh tilt housings such that the first and second thigh tilt housings are biased toward a lowered position;
- adjustment of the first and second thigh tilt housings in a vertical direction is independent of adjustment of the first and second thigh extension housings in the fore-aft direction;
- the first and second vertical planes are non-parallel to one another;
- a lift assembly that adjusts a height of the seat along a vertical axis;
- the first and second motors actuate the first and second thigh extension housings in the fore-aft direction, respectively independent of an angular orientation of the first and second thigh extension housings relative to the seat carrier;
- the first thigh tilt housing and the first thigh extension housing provide an enclosure for the first motor, and the second thigh tilt housing, and the second thigh extension housing provide an enclosure for the second motor; and
- the first and second thigh tilt housings are independently adjustable along the first and second vertical planes, respectively, wherein the first and second thigh extension housings are independently adjustable in the fore-aft direction.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
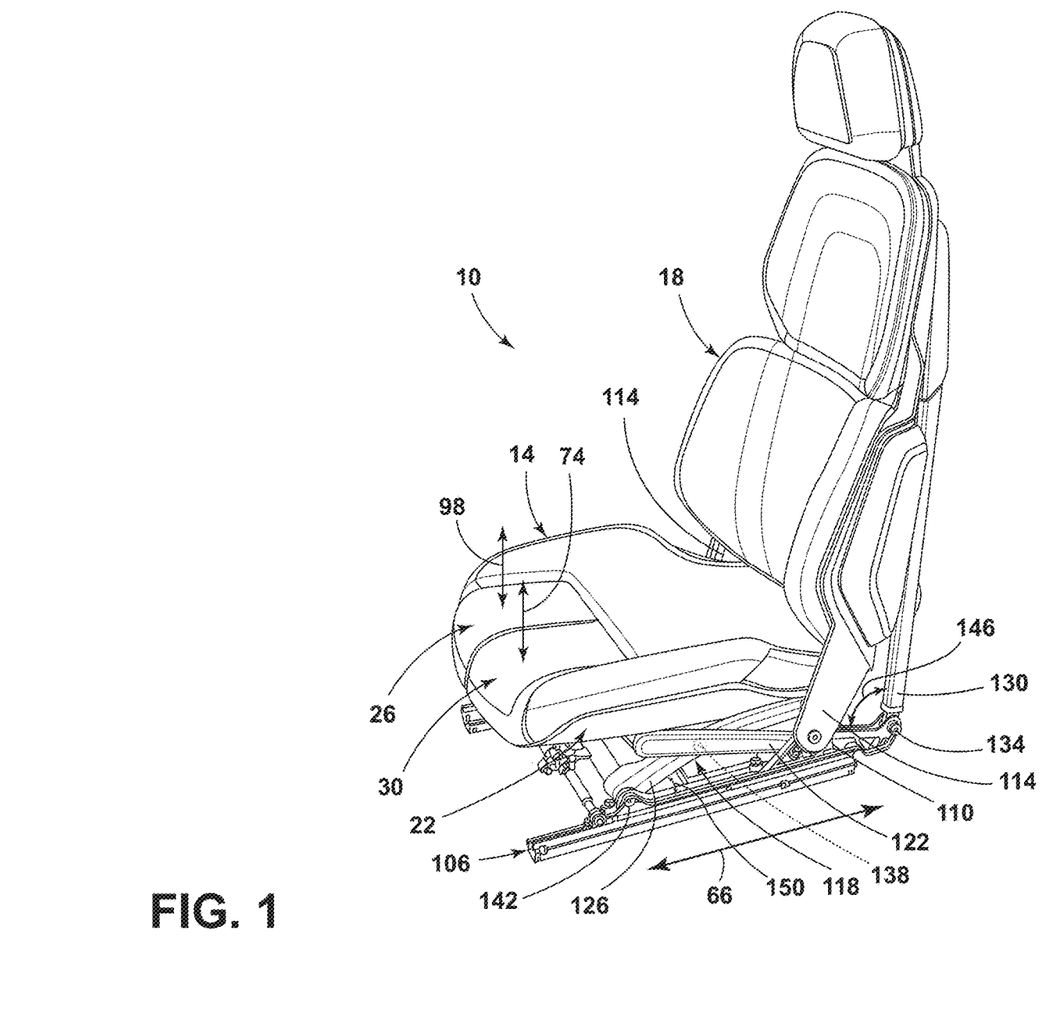
FIG. 1 is a side perspective view of a vehicle seating assembly, according to one example.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a vehicle seating assembly. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Figure 2:
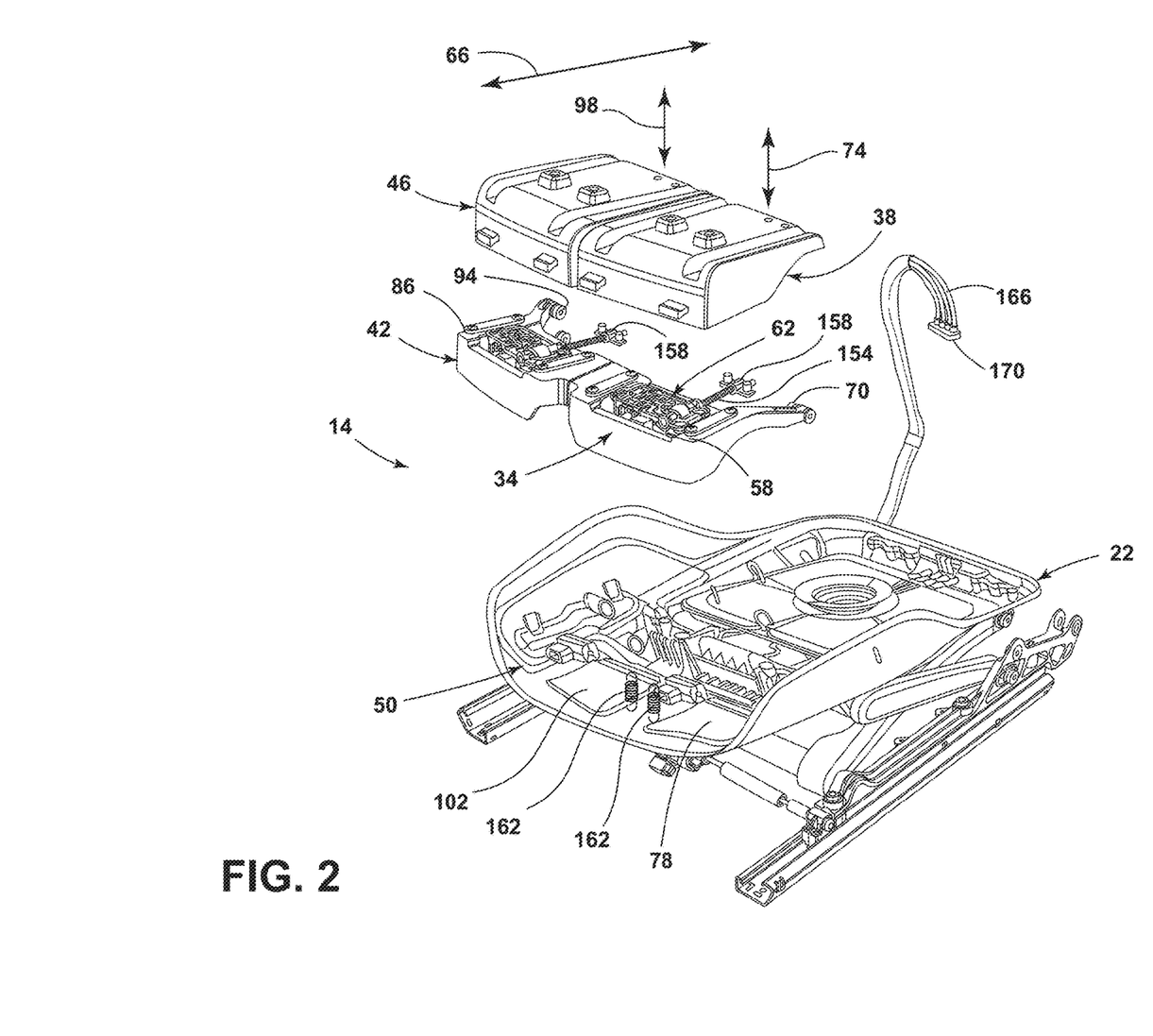
FIG. 2 is a partially exploded view of the seat, illustrating components of first and second thigh bolsters, according to one example.
Figure 3:
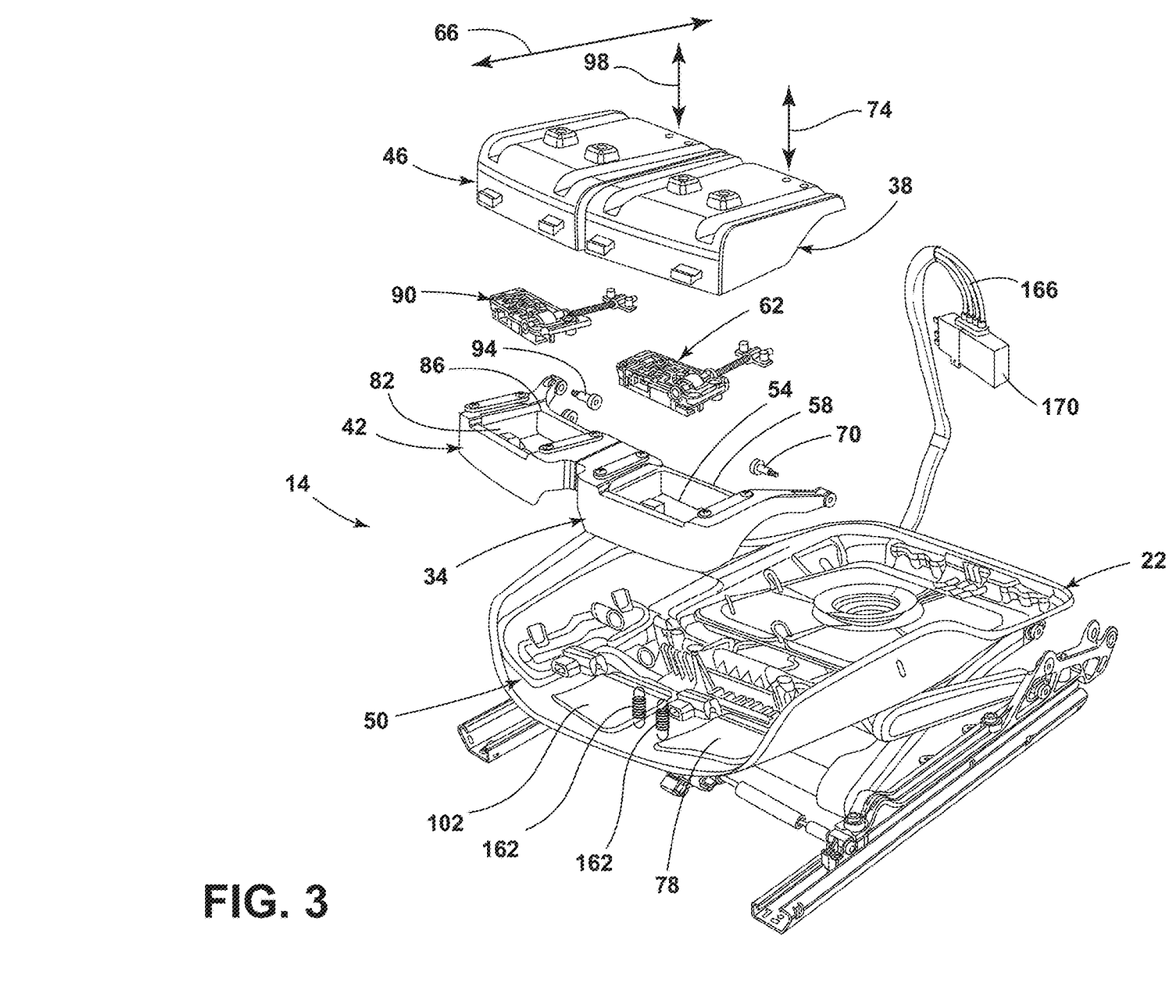
FIG. 3 is a side perspective, exploded view of the seat, illustrating various components of the seat, according to one example.

Referring to FIGS. 1-3, reference numeral 10 generally designates a vehicle seating assembly. The vehicle seating assembly 10 includes a seat 14 and a seatback 18 pivotably coupled to the seat 14. The seat 14 includes a seat carrier 22, a first thigh bolster 26, and a second thigh bolster 30. The first thigh bolster 26 includes a first thigh tilt housing 34 and a first thigh extension housing 38. The second thigh bolster 30 includes a second thigh tilt housing 42 and a second thigh extension housing 46. The first thigh tilt housing 34 is coupled to a forward region 50 of the seat carrier 22. A first recess 54 is defined by the first thigh tilt housing 34. The first recess 54 is positioned in an upper surface 58 of the first thigh tilt housing 34. A first motor 62 is received within the first recess 54. The first thigh extension housing 38 is coupled to the first motor 62. The first thigh extension housing 38 is movable in a fore-aft direction, as indicated by arrow 66, relative to the first thigh tilt housing 34. A first fastener 70 couples the first thigh tilt housing 34 to the seat carrier 22 in a manner that permits pivotable motion of the first thigh tilt housing 34 along a first vertical plane, as indicated by arrow 74. A first inflatable member 78 is positioned between the seat carrier 22 and the first thigh tilt housing 34. The second thigh tilt housing 42 is coupled to the forward region 50 of the seat carrier 22. The first and second thigh tilt housings 34, 42 are arranged along a horizontal plane of the seat carrier 22 such that the first and second thigh tilt housings 34, 42 are adjacent to one another. A second recess 82 is defined by the second thigh tilt housing 42. The second recess 82 is positioned in an upper surface 86 of the second thigh tilt housing 42. A second motor 90 is received within the second recess 82. The second thigh extension housing 46 is coupled to the second motor 90. The second thigh extension housing 46 is movable in the fore-aft direction, as indicated by arrow 66, relative to the second thigh tilt housing 42. A second fastener 94 couples the second thigh tilt housing 42 to the seat carrier 22 in a manner that permits pivotable motion of the second thigh tilt housing 42 along a second vertical plane, as indicated by arrow 98. A second inflatable member 102 is positioned between the seat carrier 22 and the second thigh tilt housing 42.

Referring again to FIG. 1, the vehicle seating assembly 10 engages with a rail assembly 106. The rail assembly 106 can be coupled to a support surface, such as a floor of a vehicle. The rail assembly 106 enables longitudinal actuation of the vehicle seating assembly 10 along a length of the rail assembly 106. The vehicle seating assembly 10 can include a pivot bracket 110. The seatback 18 couples with the pivot bracket 110 to enable pivotable motion of the seatback 18 relative to the seat 14. The pivot bracket 110 may be coupled to a portion of the rail assembly 106 that is movable relative to the portion of the rail assembly 106 that is mounted to the support surface. Accordingly, the seatback 18 may have an arm 114 that extends downwardly toward the pivot bracket 110 along a side of the seat 14. The arm 114 of the seatback 18 that couples with the pivot bracket 110 may be provided on either side of the seat 14 such that each of the arms 114 of the seatback 18 engage with a pivot bracket 110 on either side of the vehicle seating assembly 10. The vehicle seating assembly 10 can be provided with a lift assembly 118. The lift assembly 118 enables the vehicle seating assembly 10 to be adjusted along a vertical direction to accommodate occupant comfort for occupants of various heights. The lift assembly 118 can include a first linkage arm 122 and a second linkage arm 126. The first linkage arm 122 is coupled with the second linkage arm 126 and a third linkage arm 130 to affect actuation of the vehicle seating assembly 10 along a vertical axis. The third linkage arm 130 extends along a rearward exterior surface of the seatback 18 and engages with the first linkage arm 122 at a location that is below an underside of the seat 14 and rearward of the rearward exterior surface of the seatback 18.

Referring further to FIG. 1, the first and second linkage arms 122, 130 are coupled in a manner that permits rotational motion of the first and third linkage arms 122, 130 relative to one another about a pivot axis 134. The first linkage arm 122 extends forward from the pivot axis 134 where the first and second linkage arms 122, 130 are coupled to one another to engage with the second linkage arm 126. The first linkage arm 122 engages with the second linkage arm 126 at a location along the first linkage arm 122 that is between the coupling of the first linkage arm 122 and the third linkage arm 130 and a forward end of the first linkage arm 122. Said another way, the third linkage arm 130 is coupled to the first linkage arm 122 at a rearward end of the first linkage arm 122 while the second linkage arm 126 is coupled to the first linkage arm 122 at an intermediate location between the rearward end of the first linkage arm 122 and a forward end of the first linkage arm 122. The coupling between the first and second linkage arms 122, 126 define a pivot axis 138, about which the first and second linkage arms 122, 126 are rotatable relative to one another. A forward end of the second linkage arm 126 can be coupled to a linkage bracket 142 of the rail assembly 106. The second linkage arm 126 can be coupled to a rearward portion of the seat 14 at a rearward end of the second linkage arm 126. When an occupant desires to adjust a vertical height of the vehicle seating assembly 10, the occupant may actuate a lever or a button that initiates adjustment of the vertical height of the vehicle seating assembly 10. For example, actuation of the lever or the button may initiate rotational motion about the pivot axis 134 and the pivot axis 138 such that an angle 146 between the first linkage arm 122 and the third linkage arm 130 is adjusted, while also adjusting an angle 150 between the second linkage arm 126 and the rail assembly 106. In various examples, the pivot axis 138 may be a movable axis rather than a fixed pivot axis. For example, the pivot axis 138 may move along at least a portion of a length of the second linkage arm 126 as the height of the vehicle seating assembly 10 is adjusted by the lift assembly 118. Accordingly, the pivot axis 138 may describe an arcuate or parabolic path as the pivot axis 138 traverses the second linkage arm 126.

Referring now to FIGS. 2 and 3, the first and second inflatable members 78, 102 are operable between a deflated state and a fully-inflated state. The first and second inflatable members 78, 102 act upon an underside or a bottom exterior surface of the first and second thigh tilt housings 34, 42, respectively. The first and second inflatable members 78, 102 are depicted in their deflated states. One of skill in the art will recognize that the act of inflating the first and second inflatable members 78, 102 results in the first and second thigh tilt housings 34, 42 being pivoted or rotated about axes that are defined by the first and second fasteners 70, 94, respectively. Accordingly, adjusting a degree of inflation of the first and second inflatable members 78, 102 actuates the first and second thigh tilt housings 34, 42 between raised and lowered positions, respectively, along the first vertical plane, depicted by arrow 74, and the second vertical plane, depicted by arrow 98. As the first and second thigh tilt housings 34, 42 are actuated along the first and second vertical planes, respectively, the first and second motors 62, 90 move with the first and second thigh tilt housings 34, 42, respectively. Said another way, the first and second motors 62, 90 move with the first and second thigh tilt housings 34, 42 along the first and second vertical planes, respectively. Accordingly, an angular orientation of the first and second motors 62, 90 relative to the seat carrier 22 can be varied by adjusting a degree of inflation of the first and second inflatable members 78, 102. The first and second motors 62, 90 actuate the first and second thigh extension housings 38, 46 in the fore-aft direction 66 relative to the first and second thigh tilt housings 34, 42, as well as the seat carrier 22. It may be beneficial for the first and second motors 62, 90 to travel with the first and second thigh tilt housings 34, 42, as the first and second thigh tilt housings 34, 42 are actuated by the first and second inflatable members 78, 102, respectively. For example, since the first and second motors 62, 90 actuate the first and second thigh extension housings 38, 46 in the fore-aft direction 66 relative to the first and second thigh tilt housings 34, 42, by providing the first and second motors 62, 90 as angularly displaceable with the first and second thigh tilt housings 34, 42, the first and second motors 62, 90 can actuate the first and second thigh extension housings 38, 46 independent of an angular orientation of the first and second thigh extension housings 38, 46 relative to the seat carrier 22.

Referring again to FIGS. 2 and 3, adjustment of the first and second thigh tilt housings 34, 42 in the vertical directions indicated by arrows 74 and 98, respectively, is independent of adjustment of the first and second thigh extension housings 38, 46 in the fore-aft direction indicated by arrow 66. Additionally, adjustment of the first thigh tilt housing 34 along the vertical plane indicated by arrow 74 can be independent of adjustment of the second thigh tilt housing 42 along the second vertical plane indicated by arrow 98. Further, adjustment of the first thigh extension housing 38 and the fore-aft direction indicated by arrow 66 can be independent of adjustment of the second thigh extension housing 46 in the fore-aft direction indicated by arrow 66. Accordingly, the vertical adjustment and the horizontal adjustment associated with the first and second thigh bolsters 26, 30 can be independent of one another such that an occupant may adjust the height and length of the first and second thigh bolsters 26, 30 independently. Such a degree of freedom in the adjustment of the first and second thigh bolsters 26, 30 can be beneficial for meeting the increased comfort needs of occupants during extended periods of time spent in the vehicle seating assembly 10. For example, an occupant may desire that the second thigh bolster 30, which is arranged on a left side of the vehicle seating assembly 10, be positioned along the second vertical plane indicated by arrow 98 at a position that is vertically above the first thigh bolster 26 as the left leg of the occupant often remains somewhat static in vehicles provided with an automatic transmission and occupants often place their left legs in a more relaxed or less extended position. Similarly, the occupant may desire to have the first thigh bolster 26 in a vertically lowered position relative to the second thigh bolster 30 as the right leg of an occupant operating a vehicle with an automatic transmission tends to be in a more extended state as the occupant operates the accelerator and the brake pedal. Along the same lines the occupant may desire to have the first and second thigh bolsters 26, 30 at different horizontal positions relative to the seat carrier 22, or at different lengths relative to the seat carrier 22, to accommodate greater comfort for the varied positions of the occupant's right and left legs.

Referring again to FIGS. 2 and 3, in various examples, the first and second planes, which are indicated by arrows 74 and 98, respectively, may be non-parallel to one another. In such examples, the first and second thigh bolsters 26, 30 may be arranged and designed to extend from a stowed position in a diverging manner. Said another way, the first and second thigh bolsters 26, 30 may be arranged and designed to correspond with a separation or splaying of the occupants legs as the distance between the seat carrier 22 and a forward edge of the first and second thigh bolsters 26, 30 increases. The first and second motors 62, 90 may each include a lead screw 154 and a drive nut 158. The first and second thigh extension housings 38, 46 are coupled to the corresponding drive nuts 158 on the first and second motors 62, 90, respectively. Accordingly, rotational motion of the lead screws 154 is translated into linear motion of the first and second thigh extension housings 38, 46. The first motor 62 is positioned within the first recess 54 of the first thigh tilt housing 34. The first recess 54 is sized to receive the first motor 62 in a manner that places an upper extreme of the first motor 62 in a generally planar orientation with the upper surface 58 of the first thigh tilt housing 34. Accordingly, the lead screw 154 and the drive nut 158 of the first motor 62 can be actuated in the fore-aft direction, as indicated by arrow 66, without any portion of the first thigh tilt housing 34 providing a physical impedance to the motion of the lead screw 154 or the drive nut 158 of the first motor 62. Similarly, the lead screw 154 and the drive nut 158 of the second motor 90 can be actuated in the fore-aft direction, as indicated by arrow 66, without any portion of the second thigh tilt housing 42 providing a physical impedance to the motion of the lead screw 154 or the drive nut 158 of the second motor 90. The first and second thigh extension housings 38, 46 are arranged over the first and second thigh tilt housings 34, 42 and the first and second motors 62, 90, respectively. Accordingly, the first thigh tilt housing 34 and the first thigh extension housing 38 provide an enclosure for the first motor 62. Similarly, the second thigh tilt housing 42 and the second thigh extension housing 46 provide an enclosure for the second motor 90.

Referring further to FIGS. 2 and 3, the drive nuts 158 of the first and second motors 62, 90 engage with an interior underside surface of the first and second thigh extension housings 38, 46, respectively, in a manner that allows the rotational motion of the lead screws 154 to be translated into linear motion of the corresponding thigh extension housing. In various examples, the first and second thigh extension housings 38, 46 may be extended beyond a forward extreme of the seat carrier 22 such that at least a portion of the first and second thigh extension housings 38, 46 are not directly supported by the seat carrier 22 in an immediate vicinity below an underside of the first and second thigh extension housings 38, 46. The first and second thigh tilt housings 34, 42 may remain fully supported by the seat carrier 22 as the first and second thigh tilt housings 34, 42 are actuated between the lowered position and the raised position. As the first and second thigh tilt housings 34, 42 are actuated between the lowered position and the raised position by the first and second inflatable members 78, 102, respectively, the first and second inflatable members 78, 102 are adjusted between the deflated state, a partially-inflated state, and a fully-inflated state. When the first and second inflatable members 78, 102 are placed in the inflated state (e.g., the partially-inflated state or the fully-inflated state) the first and second inflatable members 78, 102 can provide a degree of compliance to the first and second thigh tilt housings 34, 42 in response to external forces. The external forces to which the first and second inflatable members 78, 102 provide compliance may be external forces applied by the legs of an occupant as the occupant adjusts their weight in the vehicle seating assembly 10.

Referring still further to FIGS. 2 and 3, in various examples, the seat 14 may be provided with one or more biasing members 162 that are coupled to the seat carrier 22 and each of the first and second thigh tilt housings 34, 42 such that the first and second thigh tilt housings 34, 42 are biased toward the lowered position. Said another way, each of the first and second thigh tilt housings 34, 42 may be provided with one or more of the biasing members 162 coupled to an underside of the corresponding thigh tilt housing and also coupled to the seat carrier 22 such that the biasing members 162 aid in the returning of the corresponding thigh tilt housing from an at least partially raised position to a position that is lower than the immediately preceding position while maintaining independent actuation of the first and second thigh tilt housings 34,42. The biasing members 162 therefore aid in maintaining continuous contact between the first and second inflatable members 78, 102 and the underside of the first and second thigh tilt housings 34, 42, respectively. Accordingly, rattling, buzzing, or vibration of the first and second thigh tilt housings 34, 42 may be mitigated by the biasing members 162. With the first and second motors 62, 90 and the first and second thigh extension housings 38, 46 being coupled to the first and second thigh tilt housings 34, 42, respectively, the biasing members 162 can act on the entirety of the first and second thigh bolsters 26, 30 in returning the first and second thigh bolsters 26, 30, to the lowered position or to a position that is lower than the immediately preceding position. The seat 14 is provided with conduits 166 and a coupling member 170. The coupling member 170 engages with a corresponding coupling member that is provided on the vehicle and can be utilized to transfer communications between the vehicle and the vehicle seating assembly 10. The conduits 166 may carry electrical signals between the vehicle seating assembly 10 and the vehicle. In some examples, the conduits 166 may include pneumatic conduits that transmit fluids, such as air from an air supply, to the first and second inflatable members 78, 102 to affect actuation of the first and second inflatable members 78, 102 between the lowered position and the raised position.

Modifications of the disclosure will occur to those skilled in the art and to those who make or use the concepts disclosed herein. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described concepts, and other components, is not limited to any specific material. Other exemplary embodiments of the concepts disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

What is claimed is:

1. A seat of a vehicle seating assembly, comprising:
    a seat carrier;
    a first thigh tilt housing coupled to a forward region of the seat carrier;

a first recess defined by the first thigh tilt housing, the first recess positioned in an upper surface of the first thigh tilt housing;

a first motor received within the first recess;

a first thigh extension housing coupled to the first motor, the first thigh extension housing being movable in a fore-aft direction relative to the first thigh tilt housing;

a first fastener that couples the first thigh tilt housing to the seat carrier in a manner that permits pivotable motion of the first thigh tilt housing along a first vertical plane;

a first inflatable member positioned between the seat carrier and the first thigh tilt housing;

a second thigh tilt housing coupled to the forward region of the seat carrier, the first and second thigh tilt housings being arranged along a horizontal plane of the seat such that the first and second thigh tilt housings are adjacent to one another;

a second recess defined by the second thigh tilt housing, the second recess positioned in an upper surface of the second thigh tilt housing;

a second motor received within the second recess;

a second thigh extension housing coupled to the second motor, the second thigh extension housing being movable in a fore-aft direction relative to the second thigh tilt housing;

a second fastener that couples the second thigh tilt housing to the seat carrier in a manner that permits pivotable motion of the second thigh tilt housing along a second vertical plane; and a second inflatable member positioned between the seat carrier and the second thigh tilt housing.

2. The seat of a vehicle seating assembly of claim 1, wherein the first and second inflatable members are operable between a deflated state and a fully-inflated state, and wherein adjustment of a degree of inflation of the first and second inflatable members actuates the first and second thigh tilt housings between raised and lowered position, respectively.

3. The seat of a vehicle seating assembly of claim 2, wherein the fully-inflated state of the first and second inflatable members provides a degree of compliance to the first and second thigh tilt housings in response to external forces, respectively.

4. The seat of a vehicle seating assembly of claim 1, wherein the first and second motors each comprise a lead screw and a drive nut, and wherein the first and second thigh extension housings are coupled to the drive nut on the first and second motors, respectively, such that rotational motion of the lead screws is translated into linear motion of the first and second thigh extension housings.

5. The seat of a vehicle seating assembly of claim 1, further comprising:

biasing members coupled to the seat carrier and each of the first and second thigh tilt housings such that the first and second thigh tilt housings are biased toward a lowered position.

6. The seat of a vehicle seating assembly of claim 1, wherein adjustment of the first and second thigh tilt housings in a vertical direction is independent of adjustment of the first and second thigh extension housings in the fore-aft direction.

7. The seat of a vehicle seating assembly of claim 1, wherein the first and second vertical planes are non-parallel to one another.

8. The seat of a vehicle seating assembly of claim 1, wherein the first and second motors move with the first and second thigh tilt housings along the first and second vertical planes, respectively.

9. The seat of a vehicle seating assembly of claim 1, wherein the first and second motors actuate the first and second thigh extension housings in the fore-aft direction, respectively, independent of an angular orientation of the first and second thigh extension housings relative to the seat carrier.

10. The seat of a vehicle seating assembly of claim 1, wherein the first thigh tilt housing and the first thigh extension housing provide an enclosure for the first motor, and wherein the second thigh tilt housing and the second thigh extension housing provide an enclosure for the second motor.

11. A seat of a vehicle seating assembly, comprising:

a seat carrier;

a first thigh tilt housing coupled to a forward region of the seat carrier;

a first recess defined by the first thigh tilt housing, the first recess positioned in an upper surface of the first thigh tilt housing;

a first motor received within the first recess;

a first thigh extension housing coupled to the first motor, the first thigh extension housing being movable in a fore-aft direction between extended and retracted positions relative to the first thigh tilt housing;

a first fastener that couples the first thigh tilt housing to the seat carrier in a manner that permits pivotable motion of the first thigh tilt housing along a first vertical plane;

a first inflatable member positioned between the seat carrier and the first thigh tilt housing, the first inflatable member being operable between a deflated state and a fully-inflated state, wherein adjusting a degree of inflation of the first inflatable member adjusts the first thigh tilt housing between raised and lowered positions along the first vertical plane, and wherein the first thigh tilt housing, the first motor, and the first thigh extension housing each move along the first vertical plane as the degree of inflation of the first inflatable member is adjusted;

a second thigh tilt housing coupled to the forward region of the seat carrier, the first and second thigh tilt housings being arranged along a horizontal plane of the seat such that the first and second thigh tilt housings are adjacent to one another;

a second recess defined by the second thigh tilt housing, the second recess positioned in an upper surface of the second thigh tilt housing;

a second motor received within the second recess;

a second thigh extension housing coupled to the second motor, the second thigh extension housing being movable in a fore-aft direction between extended and retracted positions relative to the second thigh tilt housing;

a second fastener that couples the second thigh tilt housing to the seat carrier in a manner that permits pivotable motion of the second thigh tilt housing along a second vertical plane; and a second inflatable member positioned between the seat carrier and the second thigh tilt housing, the second inflatable member being operable between a deflated state and a fully-inflated state, wherein adjusting a degree of inflation of the second inflatable member adjusts the second thigh tilt housing between raised and lowered positions along the second vertical plane, and wherein the second thigh tilt housing, the second motor, and the second thigh extension housing each move along the second vertical plane as the degree of inflation of the second inflatable member is adjusted.

12. The seat of a vehicle seating assembly of claim 11, wherein the fully-inflated state of the first and second inflatable members provides a degree of compliance to the first and second thigh tilt housings in response to external forces, respectively.

13. The seat of a vehicle seating assembly of claim 11, wherein the first and second motors each comprise a lead screw and a drive nut, and wherein the first and second thigh extension housings are coupled to the drive nut on the first and second motors, respectively, such that rotational motion of the lead screws is translated into linear motion of the first and second thigh extension housings.

14. The seat of a vehicle seating assembly of claim 11, further comprising:
 biasing members coupled to the seat carrier and each of the first and second thigh tilt housings such that the first and second thigh tilt housings are biased toward a lowered position.

15. The seat of a vehicle seating assembly of claim 11, wherein adjustment of the first and second thigh tilt housings in a vertical direction is independent of adjustment of the first and second thigh extension housings in the fore-aft direction.

16. The seat of a vehicle seating assembly of claim 11, wherein the first and second vertical planes are non-parallel to one another.

17. The seat of a vehicle seating assembly of claim 11, further comprising:
 a lift assembly that adjusts a height of the seat along a vertical axis.

18. The seat of a vehicle seating assembly of claim 11, wherein the first and second motors actuate the first and second thigh extension housings in the fore-aft direction, respectively, independent of an angular orientation of the first and second thigh extension housings relative to the seat carrier.

19. The seat of a vehicle seating assembly of claim 11, wherein the first thigh tilt housing and the first thigh extension housing provide an enclosure the first motor, and wherein the second thigh tilt housing and the second thigh extension housing provide an enclosure the second motor.

20. The seat of a vehicle seating assembly of claim 11, wherein the first and second thigh tilt housings are independently adjustable along the first and second vertical planes, respectively, and wherein the first and second thigh extension housings are independently adjustable in the fore-aft direction.

* * * * *